United States Patent
Lu et al.

(10) Patent No.: US 11,146,071 B2
(45) Date of Patent: Oct. 12, 2021

(54) COORDINATED CONTROL METHOD AND DEVICE FOR SERIES VOLTAGE SOURCE CONVERTER VALVE GROUP

(71) Applicants: NR ELECTRIC CO., LTD., Jiangsu (CN); NR ENGINEERING CO., LTD., Jiangsu (CN)

(72) Inventors: Jiang Lu, Jiangsu (CN); Yu Lu, Jiangsu (CN); Yunlong Dong, Jiangsu (CN); Yongping Wang, Jiangsu (CN); Jie Tian, Jiangsu (CN); Haiying Li, Jiangsu (CN); Zhaoqing Hu, Jiangsu (CN); Nannan Wang, Jiangsu (CN); Ke Wang, Jiangsu (CN); Jiudong Ding, Jiangsu (CN)

(73) Assignees: NR ELECTRIC CO., LTD., Jiangsu (CN); NR ENGINEERING CO., LTD., Jiangsu (CN)

( * ) Notice: Subject to any disclaimer, the term of this patent is extended or adjusted under 35 U.S.C. 154(b) by 0 days.

(21) Appl. No.: 16/770,458

(22) PCT Filed: Nov. 28, 2018

(86) PCT No.: PCT/CN2018/117947
§ 371 (c)(1),
(2) Date: Jun. 5, 2020

(87) PCT Pub. No.: WO2019/109842
PCT Pub. Date: Jun. 13, 2019

(65) Prior Publication Data
US 2021/0126462 A1    Apr. 29, 2021

(30) Foreign Application Priority Data
Dec. 7, 2017  (CN) .......................... 201711281866.4

(51) Int. Cl.
*H02J 3/36* (2006.01)
*H02M 7/25* (2006.01)
*H02M 1/00* (2006.01)

(52) U.S. Cl.
CPC ................. *H02J 3/36* (2013.01); *H02M 7/25* (2013.01); *H02M 1/0025* (2021.05)

(58) Field of Classification Search
CPC ........ H02J 3/36; H02J 2003/365; H02M 7/02; H02M 7/217; H02M 7/219; H02M 7/25
See application file for complete search history.

(56) References Cited

U.S. PATENT DOCUMENTS

| | | | | |
|---|---|---|---|---|
| 2012/0314466 A1* | 12/2012 | Goerges | ............ | H02M 7/53873 363/78 |
| 2013/0148392 A1* | 6/2013 | Inoue | .................... | H02M 7/483 363/68 |
| 2014/0078796 A1* | 3/2014 | Inoue | ..................... | H02M 5/10 363/68 |
| 2015/0229234 A1* | 8/2015 | Park | .................... | H02M 5/4585 363/78 |

(Continued)

FOREIGN PATENT DOCUMENTS

| | | |
|---|---|---|
| CN | 103269083 A | 8/2013 |
| CN | 104201910 A | 12/2014 |

(Continued)

OTHER PUBLICATIONS

International Search Report dated Feb. 27, 2019 in International Application No. PCT/CN2018/117947, total 2 pages.

*Primary Examiner* — Fred E Finch, III (74) *Attorney, Agent, or Firm* — Masuvalley & Partners (57) ABSTRACT

A coordinated control method for series voltage source converter valve groups comprises: allocating a total direct-current voltage reference value or a total active power reference value at the end where a direct-current electrode series voltage source converter valve group is located according to the total number of voltage source converter valve groups in series; for a direct-current voltage control end, controlling the direct-current voltage of each valve (Continued)

group according to the assigned direct-current voltage reference value for each valve group; for an active power control end, controlling the active power of each valve group according to the assigned active power reference value for each valve group and based on adding the active power compensation amount of the valve group which has voltage equalization effects on the valve group. Correspondingly, also providing a coordinated control device for series voltage source converter valve groups. The direct-current voltage equalization of each valve group in operation of the direct-current voltage control end or the active power control end of the series voltage source converter valve group is achieved.

8 Claims, 5 Drawing Sheets

(56) References Cited

U.S. PATENT DOCUMENTS

| | | | | |
|---|---|---|---|---|
| 2016/0118908 A1* | 4/2016 | Bhalodi | ............... | H02M 7/483 |
| | | | | 363/89 |
| 2016/0308466 A1* | 10/2016 | Oates | ................ | H02M 7/797 |
| 2016/0336874 A1* | 11/2016 | Kikuchi | ............... | H02M 7/483 |
| 2018/0006462 A1* | 1/2018 | Lu | ................ | H02M 1/088 |
| 2019/0252885 A1* | 8/2019 | Lu | ................ | H02J 3/36 |
| 2020/0195165 A1* | 6/2020 | Shinoda | ............. | H02M 7/2173 |
| 2020/0209904 A1* | 7/2020 | Adamczyk | ........ | H02M 7/53871 |
| 2020/0295563 A1* | 9/2020 | Lu | ............ | H02J 1/082 |

FOREIGN PATENT DOCUMENTS

| | | |
|---|---|---|
| CN | 106655239 A | 5/2017 |
| CN | 106684901 A | 5/2017 |
| CN | 107994599 A | 5/2018 |
| WO | 2016/177398 A1 | 11/2016 |

* cited by examiner

COORDINATED CONTROL METHOD AND DEVICE FOR SERIES VOLTAGE SOURCE CONVERTER VALVE GROUP

RELATED APPLICATION

This application is the U.S. National Phase of and claims priority to International Patent Application No. PCT/CN2018/117947, International Filing Date Nov. 28, 2018; which claims benefit of Chinese Patent Application No. 201711281866.4 filed Dec. 7, 2017; both of which are incorporated herein by reference in their entireties.

TECHNICAL FIELD

The present invention belongs to the technical field of direct-current (DC) transmission, and particularly relates to a coordinated control method for series voltage source converter valve group, and a coordinated control device for series voltage source converter valve group.

TECHNICAL BACKGROUND

High Voltage Direct-Current (HVDC) transmission systems can be divided into to types conventional direct-current transmission systems based on thyristor converter valves (LCC-HVDC) and flexible direct-current transmission systems based on fully-controlled voltage source converters (VSC-HVDC). The conventional DC transmission system has low cost, low loss and mature operation technology. Most of the DC transmission systems currently in operation in the world are LCC-HVDC systems, but the conventional DC transmission system has many disadvantages, such as the converter side is prone to commutation failure, the strong dependence on the AC system, the need to adopt a lot of reactive power, and the large area for converter station. A new generation flexible DC transmission system has the advantages of decoupled control for active power and reactive power, the ability to supply power to passive network, compact structure, small space occupation, no commutation failure, etc., but it also has the disadvantages of high cost. Therefore, combining the advantages of both conventional DC transmission and flexible DC transmission, a hybrid DC transmission technology using a thyristor converter valve at one end of the converter station and a voltage source converter valve at the other end of the converter station has a good engineering application prospect. Over the long term, with the reduction of the price of the fully controlled device used in the voltage source converter valve, the flexible DC transmission technology using the voltage source converter valve at both ends of the converter station will also be more and more widely used.

Figure 1:
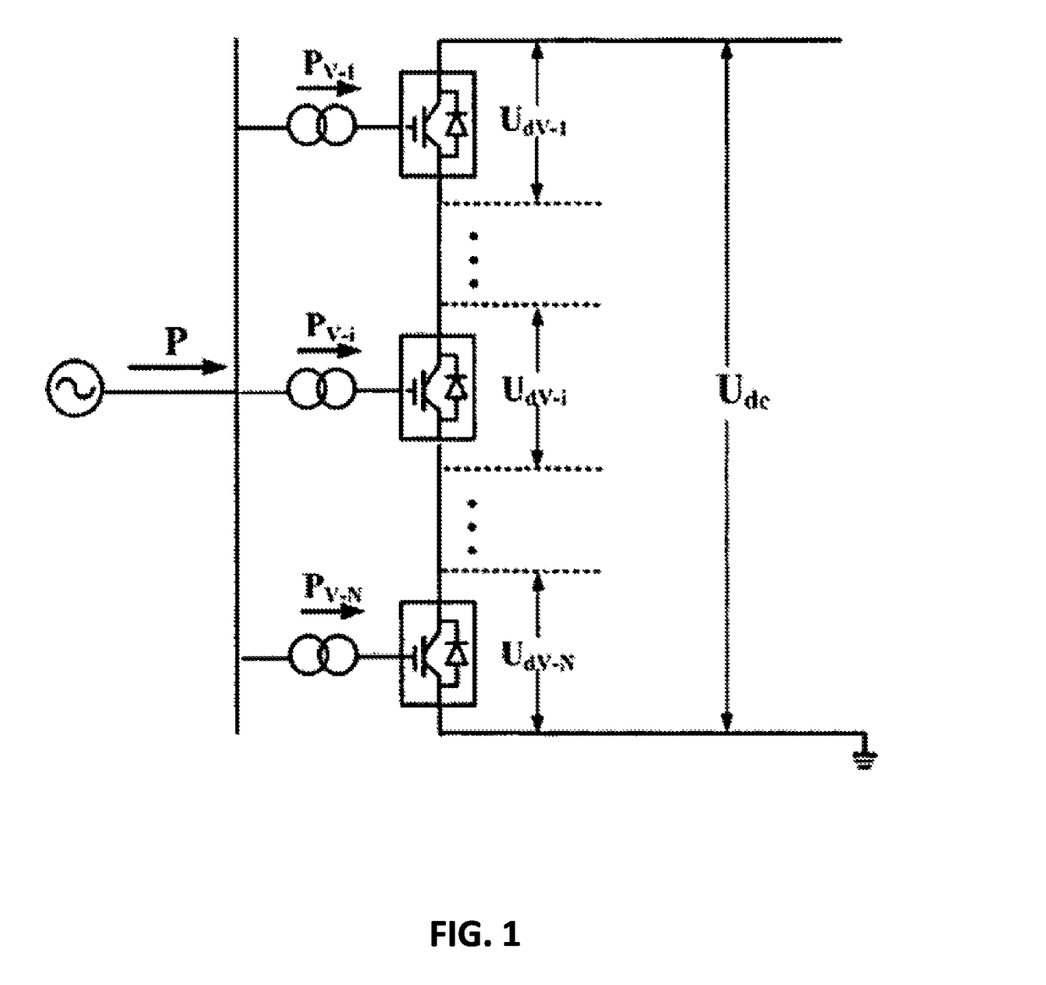
FIG. 1 is a schematic diagram of a topology of series voltage source converter valve groups according to the present invention.

In order to meet the needs for long-distance and large-capacity power transmission, conventional DC transmission projects use two or more thyristor converter valve groups in series to improve the DC voltage level and transmission capacity of DC transmission systems. Currently, there are many projects using thyristor converter valve group in series for conventional DC transmission in China, which have been completed and put into operation. A series hybrid DC transmission technology using series thyristor converter valve groups in converter stations at one end and using series voltage source converter valve groups in converter stations at the other end, and a flexible DC transmission technology using series voltage source converter valve groups at both ends is still in the research stage. The topology of the series voltage source converter valve group is shown in FIG. 1.

For a DC transmission system using the technology of series converter valve groups, the control system is required to coordinately control each converter valve group and realize the DC voltage balance of each converter valve group to ensure the stable operation of the entire DC system. At present, the coordinated control technology of series thyristor converter valve groups in conventional DC transmission systems has matured.

For series hybrid DC transmission systems and series voltage source converter valve groups in flexible DC transmission systems, because the characteristics of the fully controlled devices used herein are essentially different from those of semi-controlled thyristors, the coordinated control method of the series thyristor converter salve groups cannot be applied to the series voltage source converter valve groups. At present, no method that can effectively achieve the DC voltage balance of the series voltage source converter valve group has been provided. Therefore, it is necessary to provide a coordinated control method and device for series voltage source converter valve groups based the characteristics of the voltage source converter valves to meet the operation requirements of a series hybrid DC transmission system or a series flexible DC transmission system.

SUMMARY OF THE INVENTION

To response to the deficiencies of the prior art, an object of the present invention is to provide a coordinated control method for series voltage source converter valve groups and a coordinated control device for series voltage source converter valve groups, which are used to achieve the DC voltage balance of each voltage source converter valve group when two or more voltage source converter valve groups operating in series are used in DC electrode of the DC transmission system, so as to meet the operation requirements of a series hybrid DC transmission system or a series flexible DC transmission system.

In order to achieve the above objective, the technical solution adopted by the present invention is to provide a coordinated control method of series voltage source converter valve groups, the series voltage source converter valve group formed by connecting two or more voltage source converter valve groups in series, the series voltage source converter valve group is able to be configured at a DC voltage control end or active power control end of any DC electrode in a DC transmission system. The control method includes:

the following steps for the series voltage source converter valve group configured at a DC voltage control end of the DC electrode:
  Step a1, obtaining a total DC voltage reference value $U_{dcref}$ at the end where the series voltage source converter valve group is located according to a DC voltage control target of the DC electrode, allocating the total DC voltage reference value $U_{dcref}$ according to a total number N of voltage source converter valve groups in series, and obtaining a DC voltage reference value $U_{dVref\text{-}i}$ of the valve group for each operating voltage source converter valve group after evenly allocating the total DC voltage reference value, where $$U_{dVref\text{-}i} = \frac{U_{dcref}}{N},$$

i∈(1, ..., N), N is a positive integer;

Step a2, obtaining a DC voltage measured value $U_{dV-i}$ of the valve group for each operating valve group in the series voltage source converter valve groups;

Step a3, using ½ of the DC voltage reference value $U_{dVref-i}$ of the valve group for each operating valve group in the series voltage source converter valve groups as a bridge arm voltage DC bias of this valve group;

Step a4: for each operating valve group of the series voltage source converter valve groups, calculating a difference between the DC voltage reference value $U_{dVref-i}$ of the valve group and the DC voltage measured value $U_{dV-i}$ of the valve group and inputting the difference into a DC voltage control outer loop of this valve group, so as to perform closed-loop control of the DC voltage of this valve group, the control method including following steps for the series voltage source converter valve groups configured at the active power control end of the DC electrode:

Step b1, obtaining a total active power reference value $P_{ref}$ at the end where the series voltage source converter valve group is located according to an active power control target of the DC electrode, allocating the total active power reference value $P_{ref}$ according to the total number N of voltage source converter valve groups in series, and obtaining an active power reference value $P_{Vref-i}$ of the valve group for each operating voltage source converter valve group after evenly allocating the total active power reference value, where $$P_{Vref-i} = \frac{P_{ref}}{N},$$

i∈(1, ..., N), N is a positive integer;

Step b2, obtaining a total DC voltage reference value $U_{dcref}$ at the end where the series voltage source converter valve group is located, allocating the total DC voltage reference value $U_{dcref}$ according to the total number N of voltage source converter valve groups in series, and obtaining a DC voltage reference value $U_{dVref-i}$ of the valve group for each operating voltage source converter valve group after evenly allocating the total DC voltage reference value $U_{dcref}$, here $$U_{dVref-i} = \frac{U_{dcref}}{N},$$

i∈(1, ..., N), N is a positive integer;

step b3, obtaining a DC voltage measured value $U_{dV-i}$ of the valve group for each operating valve group in the series voltage source converter valve groups;

step b4, using ½ of the DC voltage reference value $U_{dVref-i}$ of the valve group for each operating valve group in the series voltage source converter valve groups as a bridge arm voltage DC bias of this valve group;

step b5, for each operating valve group of the series voltage source converter valve groups, obtaining an active power compensation amount $\Delta P_{V-i}$ of the valve group which has voltage-equalization effect for the valve group, and adding the active power compensation amount $\Delta P_{V-i}$ of the valve group and the active power reference value $P_{dVref-i}$ of the valve group to obtain a value, and inputting the value into active power control outer loop of the valve group so as to control the active power of this valve group.

For the series voltage source converter valve group configured at the active power control end of DC electrode, the steps of obtaining an active power compensation amount $\Delta P_{V-i}$ of the valve group for each operating valve group, which has voltage-equalization effect for the valve group, include:

Step c1, calculating a difference between DC voltage reference value $U_{dVref-i}$ of the valve group and the DC voltage measured value $U_{dV-i}$ of the valve group to obtain a DC voltage deviation $\Delta U_{dV-i}$ of this valve group;

Step c2, inputting the DC voltage deviation $\Delta U_{dV-i}$ of this valve group into a valve group voltage-equalizing compensator of this valve group, and calculating the DC voltage deviation $\Delta U_{dV-i}$ of this valve group in the valve group voltage-equalizing compensator of this valve group by using proportional or integral or proportional plus integral method to obtain the active power compensation amount $\Delta P_{dV-i}$ of the valve group.

For the series voltage source converter valve group configured at the DC voltage control end of DC electrode, the current inner loop limit of one operating valve group is simultaneously applied to other operating valve groups to maintain the DC voltage balance between each operating valve group if the output of the DC voltage control outer loop of this operating valve group is limited by a current inner loop limit.

For the series voltage source converter valve group configured at the active power control end of DC electrode, the current inner loop limit of one operating valve group is simultaneously applied to other operating valve groups to maintain the DC voltage balance between each operating valve group if the output of the active power control outer loop of this operating valve group is limited by a current inner loop limit.

The present invention also provides a coordinated control device for series voltage source converter valve groups, which comprises a discrimination unit, an acquisition and distribution unit, a DC voltage control unit and an active power control unit, wherein:

the discrimination unit configured for determining whether the end where the series voltage source converter valve group is located is a DC voltage control end based on the operating status of the DC electrode;

the acquisition and distribution unit configured for obtaining a total DC voltage reference value $U_{dcref}$, a total active power reference value $P_{ref}$, a DC voltage measured value $U_{dV-i}$ of each valve group among operating valve groups etc. based on the operating status of the DC electrode, and allocating the total DC voltage reference value $U_{dcref}$ and the total active power reference value $P_{ref}$ according to the total number N of voltage source converter valve groups in series, and obtaining a DC voltage reference value $U_{dVref-i}$ of the valve group and the active poker reference value $P_{Vref-i}$ of the valve group for each operating voltage source converter valve group after evenly allocating the total DC voltage reference value;

the DC voltage control unit configured for controlling the DC voltage of the valve group based on the DC voltage reference value $U_{dVref-i}$ of the valve group and the DC voltage measured value $U_{dV-i}$ of the valve group for each operating valve group in the series voltage source converter valve groups at the DC voltage control end of DC electrode, and realizing the control for the DC voltage of the DC electrode and the DC voltage balance for each operating valve group;

the active power control unit configured for controlling the active power of the valve group based on an active power reference value $P_{Vref-i}$ of the valve group and an active power compensation amount $\Delta P_{V-i}$ of the valve group for each operating valve group in the series voltage source converter valve groups at the active power control end of DC electrode, and realizing the control for the active power of the DC electrode and the DC voltage balance for each operating valve group;

the DC voltage control unit comprising the following subunits:

a calculation subunit of DC voltage reference value of the valve group for DC voltage control, configured for obtaining a total DC voltage reference value $U_{dcref}$ at the end where the series voltage source converter valve group is located according to a DC voltage control target of the DC electrode, allocating the total DC voltage reference value according to the total number N of voltage source converter valve groups in series, and obtaining a DC voltage reference value $U_{dVref-i}$ of the valve group for each operating voltage source converter valve group after evenly allocating the total DC voltage reference value, where $$U_{dVref-i} = \frac{U_{dcref}}{N},$$

i∈(1, . . . , N), N is a positive integer;

a receiving subunit of DC voltage measured value of the valve group for DC voltage control, configured for obtaining a DC voltage measured value $U_{dV-i}$ of the valve group for each operating valve group in the series voltage source converter valve groups;

a calculation subunit of DC bias of the valve group for DC voltage control, configured for using ½ of the DC voltage reference value $U_{dVref-i}$ of the valve group for each operating valve group in the series voltage source converter valve groups as a bridge arm voltage DC bias of this valve group;

a control subunit of the valve group for DC voltage control, configured for calculating a difference between the DC voltage reference value $U_{dVref-i}$ of the valve group and the DC voltage measured value $U_{dV-i}$ of the valve group for each operating valve group in the series voltage source converter valve groups, and inputting the difference into a DC voltage control outer loop of thus valve group, so as to perform closed-loop control of the DC voltage of this valve group, the active power control unit including the following subunits:

a calculation subunit of active power reference value of the valve group for active power control, configured for obtaining a total active power reference value $P_{ref}$ at the end where the series voltage source converter valve group is located according to an active power control target of the DC electrode, allocating the total active power reference value according to the total number N of voltage source converter valve groups in series, and obtaining an active power reference value $P_{Vref-i}$ of the valve group for each operating voltage source converter valve group after evenly allocating the total active power reference value, where $$P_{Vref-i} = \frac{P_{ref}}{N},$$

i∈(1, . . . , N), N is a positive integer;

a calculation subunit of DC voltage reference value of the valve group for active power control, configured for obtaining a total DC voltage reference value $P_{ref}$ at the end where the series voltage source converter valve group is located, allocating the total DC voltage reference value according to the total number N of voltage source converter valve groups in series, and obtaining a DC voltage reference value $U_{dVref-i}$ of the valve group for each operating voltage source converter valve group after evenly allocating the total DC voltage reference value, where $$U_{dVref-i} = \frac{U_{dcref}}{N},$$

i∈(1, . . . , N), N is a positive integer;

a receiving subunit of DC voltage measured value of the valve group for active power control, configured for obtaining a DC voltage measured value $U_{dV-i}$ of the valve group for each operating valve group in the series voltage source converter valve groups;

a calculation subunit of DC bias of the valve group for active power control, configured for using ½ of the DC voltage reference value $U_{dVref-i}$ of the valve group for each operating valve group in the series voltage source converter valve groups as a bridge arm voltage DC bias of this valve group;

a control subunit of valve group for active power control, configured for obtaining an active power compensation amount $\Delta P_{V-i}$ of the valve group which has voltage-equalization effect for the valve group for each operating valve group of the series voltage source converter valve groups, and adding the active power compensation amount $\Delta P_{V-i}$ of the valve group and the active power reference value $P_{Vref-i}$ of the valve group to obtain a value, and inputting the value into active power control outer loop of the valve group so as to control the active power of this valve group.

In the control subunit of valve group for active power control, specific steps of obtaining an active power compensation amount $\Delta P_{V-i}$ of the valve group for each operating valve group, which has voltage-equalization effect for the valve group, include:

Step c1, calculating a difference between DC voltage reference value $U_{dVref-i}$ of the value group and the DC voltage measured value $U_{dV-i}$ of the valve group to obtain a DC voltage deviation $\Delta U_{dV-i}$ of this valve group;

Step c2, inputting the DC voltage deviation $\Delta U_{dV-i}$ of this valve group into a value group voltage-equalizing compensator of this valve group, and calculating the DC voltage deviation $\Delta U_{dV-i}$ of this valve group in the valve group voltage-equalizing compensator of this valve group by using proportional or integral or proportional plus integral method to obtain the active power compensation amount $\Delta P_{V-i}$ of the valve group.

In the DC voltage control unit, the current inner loop limit of one operating valve group is simultaneously applied to other operating valve groups to maintain the DC voltage balance between each operating valve group if the output of the DC voltage control outer loop of this operating valve group is limited by a current inner loop limit.

In the active power control unit, the current inner loop limit of one operating valve group is simultaneously applied to other operating valve groups to maintain the DC voltage balance between each operating valve group if the output of the active power control outer loop of this operating valve group is limited by a current inner loop limit.

The beneficial effect of the present invention is that the present invention provides a coordinated control method and device suitable for series voltage source converter valve groups, by adopting the proposed control strategy at the DC voltage control end and the active power control end of DC electrode, the DC voltage balance of each voltage source converter valve group operating in series can be achieved to ensure the stable operation of the DC system.

DESCRIPTION OF EMBODIMENTS

The technical solutions of the present invention will be described in detail below with reference to the drawings and specific embodiments.

The present invention provides a coordinated control method for series voltage source converter valve groups, and a coordinated control device for series voltage source converter valve groups, which are used to achieve the DC voltage balance of each voltage source converter valve group when two or more voltage source converter valve groups operating in series are used in DC electrode of the DC power transmission system, so as to meet the operation requirements of a series hybrid DC power transmission system or a series flexible DC power transmission system. The topological schematic diagram of the series voltage source converter valve groups is shown in FIG. 1. The series voltage source converter valve groups can be configured at either the DC voltage control end or the active power control end of any DC electrode of a DC transmission system.

Figure 2:
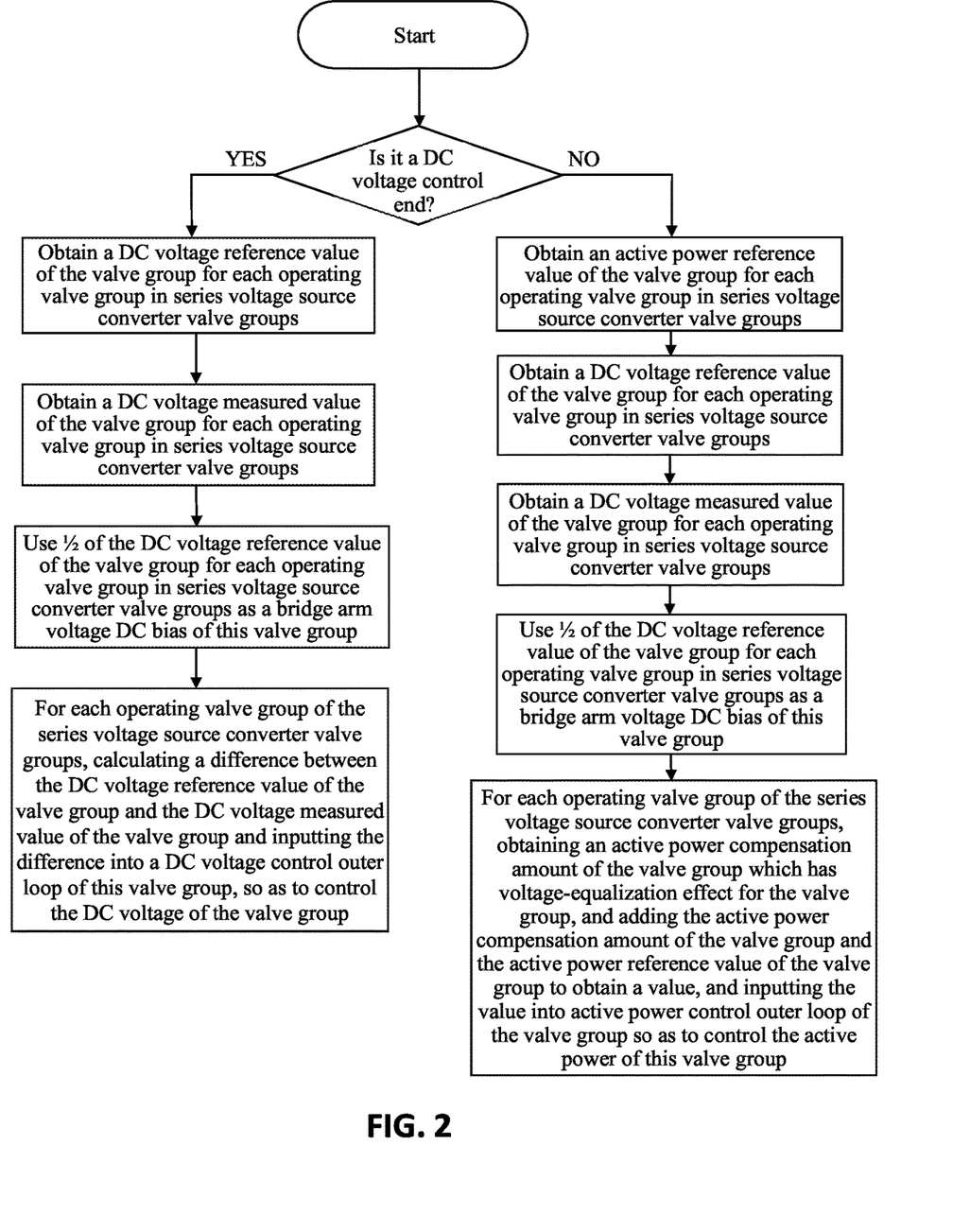
FIG. 2 is a flowchart of a coordinated control method for series voltage source converter valve groups provided by the present invention.

In order to achieve the above objective, the technical solution of the present invention is to provide a coordinated control method of series voltage source converter valve groups, as shown in FIG. 2:

As for the series voltage source converter valve groups configured at the DC voltage control end of DC electrode, the method includes the following implementation steps:

Step a1, obtaining a total DC voltage reference value $U_{dcref}$ at the end where the series voltage source converter valve group is located according to a DC voltage control target of the DC electrode, allocating the total DC voltage reference value according to the total number N of voltage source converter valve groups in series, and obtaining a DC voltage reference value $U_{dVref-i}$ of the valve group for each operating voltage source converter valve group after evenly allocating the total DC voltage reference value, where $$U_{dVref-i} = \frac{U_{dcref}}{N},$$

$i \in (1, \ldots, N)$, N is a positive integer;

The DC voltage control target of the DC electrode is generally the DC voltage reference value of the rectifier station set by the operator. When the end where the series voltage source converter valve group is located is a rectifier station, the total DC voltage reference value $U_{dcref}$ is equal to the DC voltage reference value of the rectifier station set by the operator; when the end where the series voltage source converter valve group is located is an inverter station, the total DC voltage reference value $U_{dcref}$ is equal to the DC voltage reference value of the rectifier station set by the operator minus the DC line voltage drop.

Step a2 obtaining a DC voltage measured value $U_{dV-i}$ of the valve group for each operating valve group in the series voltage source convener valve groups, For a voltage source converter valve group, its operating characteristics are shown in equation (1):

$$\begin{cases} u_{pj} = \frac{1}{2}U_{dV} - u_{vjref} \\ u_{nj} = \frac{1}{2}U_{dV} + u_{vjref} \end{cases} \quad (1)$$

wherein, $u_{pj}$ and $u_{nj}$ are the upper bridge arm voltage and lower bridge arm voltage of the voltage source converter j (j=a, b, c) phase, $\frac{1}{2}U_{dV}$ is the bridge arm voltage DC bias, $u_{vjref}$ is the AC voltage reference wave of j phase.

Figure 3:
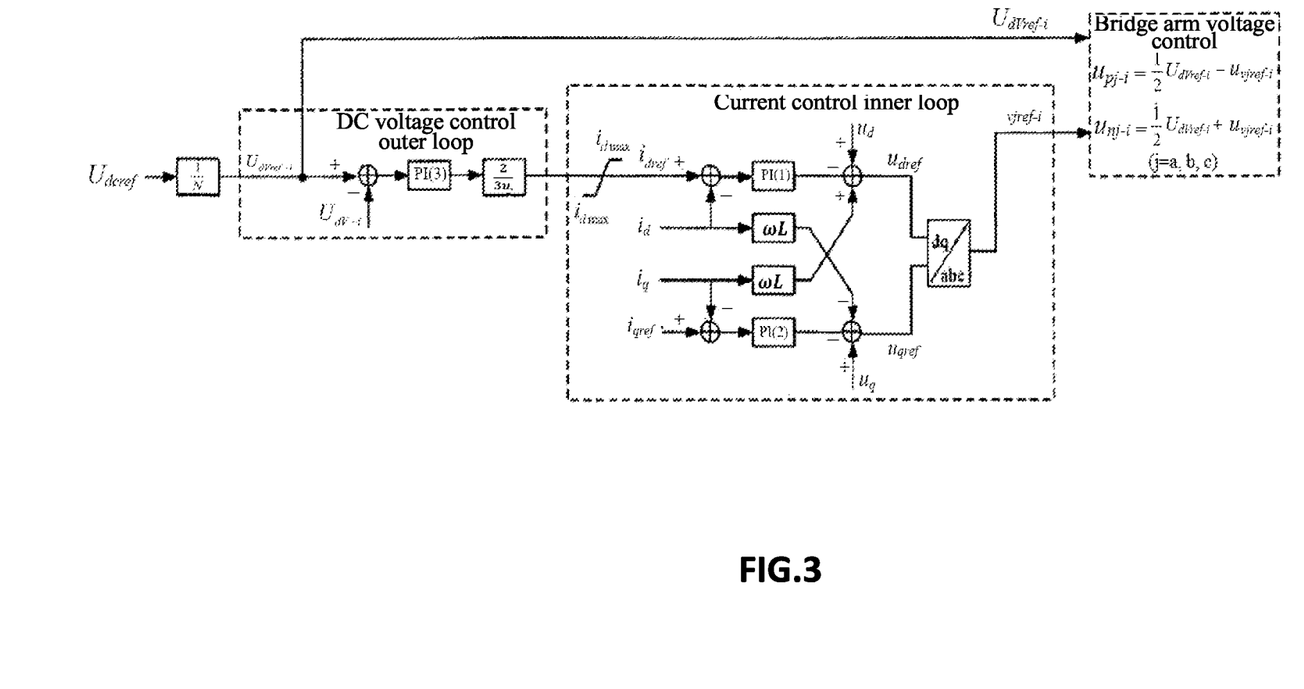
FIG. 3 is a schematic diagram of a coordinated control strategy of series voltage source converter valve groups configured at DC voltage control end of DC electrode provided by the present invention.

The control of the voltage source converter valve groups is realized by controlling the voltage of the upper and lower bridge arms of each phase. As can be seen from equation (1), the bridge arm voltage includes two parts: the DC bias and the AC voltage reference wave. Therefore, a control strategy shown in FIG. 3 can be used, including the following steps:

Step a3, using ½ of the DC voltage reference value $U_{dVref-i}$ of the valve group for each operating valve group in the series voltage source converter valve groups as a bridge arm voltage DC bias of this valve group;

Step a4: for each operating valve group of the series voltage source converter valve groups, calculating a difference between the DC voltage reference value $U_{dVref-i}$ of the valve group and the DC voltage measured value $U_{dV-i}$ of the valve group and inputting the difference into a DC voltage control outer loop of this valve group, so as to perform closed-loop control of the DC voltage of this valve group.

The control of the DC voltage of the valve group can be achieved by using the bridge arm voltage DC bias of this valve group described in step a3 and the AC voltage reference wave of the valve group described in step a4 to control the bridge arm voltage of the upper and lower bridge arms of the phases of the valve group; by using the above control strategy, each operating valve group in the series voltage source converter valve groups can achieve balanced control of the DC voltage for each operating valve group at the DC voltage control end.

The control method includes the following steps for the series voltage source converter valve groups configured at the active power control end of the DC electrode.

Step b1, obtaining a total active power reference value $P_{ref}$ at the end where the series voltage source converter valve group is located according to an active power control target of the DC electrode, allocating the total active power reference value according to the total number N of voltage source converter valve groups in series, and obtaining an active power reference value $P_{Vref-i}$ of the valve group for each operating voltage source converter valve group after evenly allocating the total active power reference value, where $$P_{Vref-i} = \frac{P_{ref}}{N},$$

$i \in (1, \ldots, N)$, N is a positive integer;

Step b2, obtaining a total DC voltage reference value $U_{dcref}$ at the end where the series voltage source converter valve group is located, allocating the total DC voltage reference value according to the total number N of voltage source converter valve groups in series, and obtaining a DC voltage reference value $U_{dVref-i}$ of the valve group for each operating voltage source converter value group after evenly allocating the total DC voltage reference value, where $$U_{dVref-i} = \frac{U_{dcref}}{N},$$

$i \in (1, \ldots, N)$, N is a positive integer;

Step b3, obtaining a DC voltage measured value $U_{dV-i}$ of the valve group for each operating valve group in the series voltage source converter valve groups.

Figure 4:
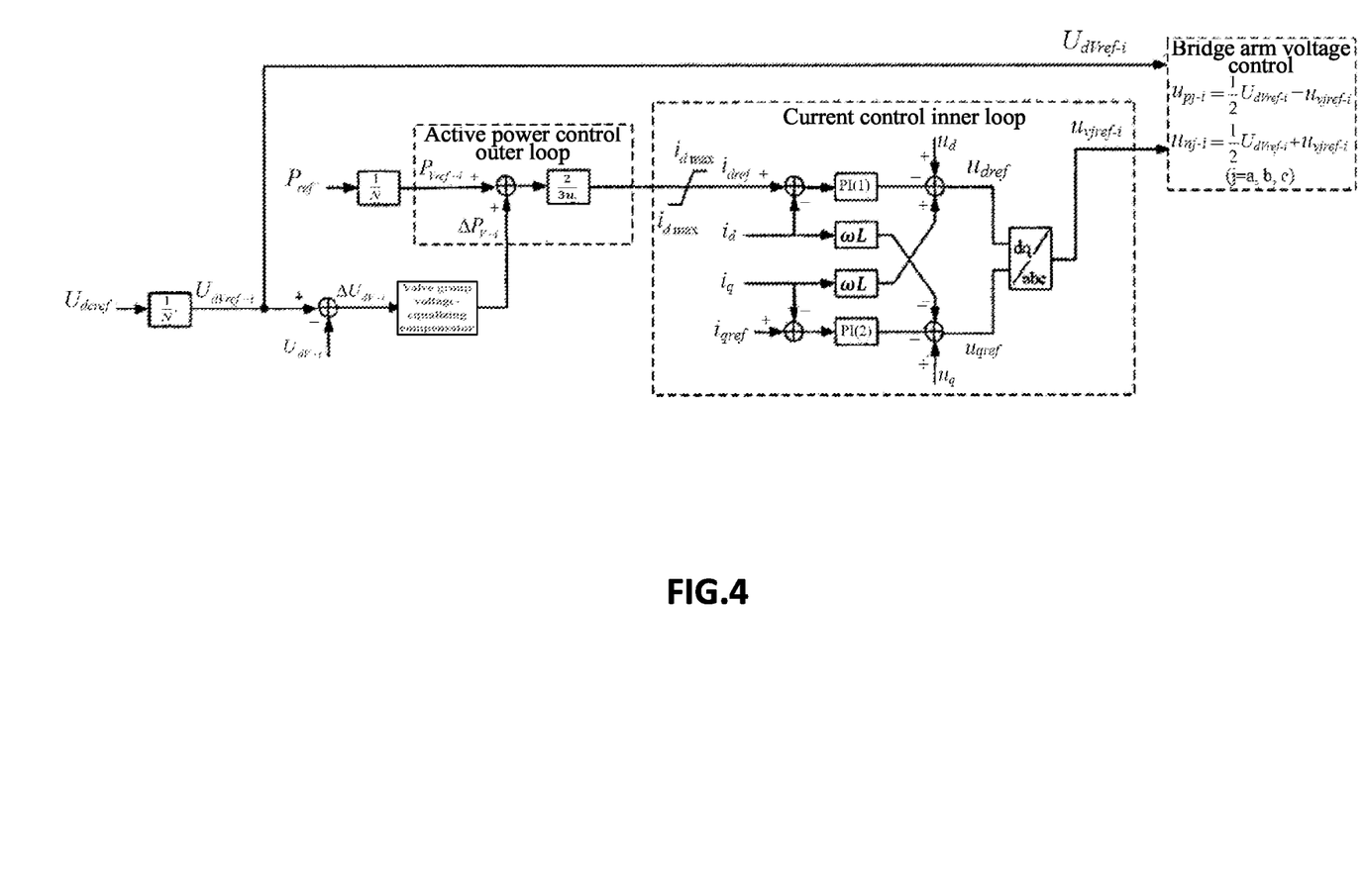
FIG. 4 is a schematic diagram of a coordinated control strategy of series voltage source converter valve groups configured at active power control end of DC electrode provided by the present invention.

The coordinated control strategy shown in FIG. 4 is adopted, which specifically includes:

Step b4: using of the DC voltage reference value $U_{dVref-i}$ of the valve group for each operating valve group in the series voltage source converter valve groups as a bridge arm voltage DC bias of this valve group;

Step b5: for each operating valve group of the series voltage source converter valve groups, obtaining an active power compensation amount $\Delta P_{V-i}$ of the valve group which has voltage-equalization effect for the valve group, and adding the active power compensation amount $\Delta P_{V-i}$ of the valve group and the active power reference value $P_{Vref-i}$ of the valve group to obtain a value, and inputting the value into active power control outer loop of the valve group so as to control the active power of this valve group;

The control of active power of this valve group can be achieved by using the DC bias of the bridge arm voltage of the valve group described in step b4 and the AC voltage reference wave of the valve group described in step b5 to control the bridge arm voltage of the upper and lower bridge arms of each phase of the valve group.

For the series voltage source converter valve group configured at the active power control end of the DC electrode, the steps of obtaining an active power compensation amount $\Delta P_{V-i}$ of the valve group for each operating valve group, which has voltage-equalization effect for the valve group, including:

Step c1: calculating a difference between DC voltage reference value $U_{dVref-i}$ of the valve group and the DC voltage measured value $U_{dV-i}$ of the valve group to obtain a DC voltage deviation $\Delta U_{dV-i}$ of this valve group;

Step c2, inputting the DC voltage deviation $\Delta U_{dV-i}$ of this valve group into a valve group voltage-equalizing compensator of this valve group, and calculating the DC voltage deviation $\Delta U_{dV-i}$ of this valve group in the valve group voltage-equalizing compensator of this valve group by using proportional or integral or proportional plus integral method to obtain the active power compensation amount $\Delta P_{V-i}$ of the valve group.

By superimposing the active power compensation amount $\Delta P_{V-i}$ of the valve group on the basis of the active power reference value $P_{Vref-i}$ of the valve group, the active power output of the valve group can be dynamically adjusted, which can indirectly achieve the control of the DC voltage of the valve group. The control strategy described above can realize the balanced control of the DC voltage for each operating valve group at the active power control end.

For series voltage source converter valve groups configured at the DC voltage control end of DC electrode, when the output of the DC voltage control outer loop of one operating valve group is limited by the inner loop current limit caused by the reduced inner loop current limit $I_{dmax}$, the DC voltage of this valve group deviates from the reference value of the DC voltage of the valve group due to the limited power output. To this end, the current inner loop limit of the valve group will be simultaneously applied to other operating valve groups to maintain the DC voltage equalization.

For series voltage source converter valve groups configured at the active power control end of a DC electrode, when the output of the active power control outer loop of one operating valve group is limited by the inner loop current limit caused by the reduced inner loop current limit $I_{dmax}$, the DC voltage of this valve group deviates from the reference value of the DC voltage of the valve group due to the limited power output. To this end, the current inner loop limit of the valve group will be simultaneously applied to other operating valve groups to maintain the DC voltage equalization.

Figure 5:
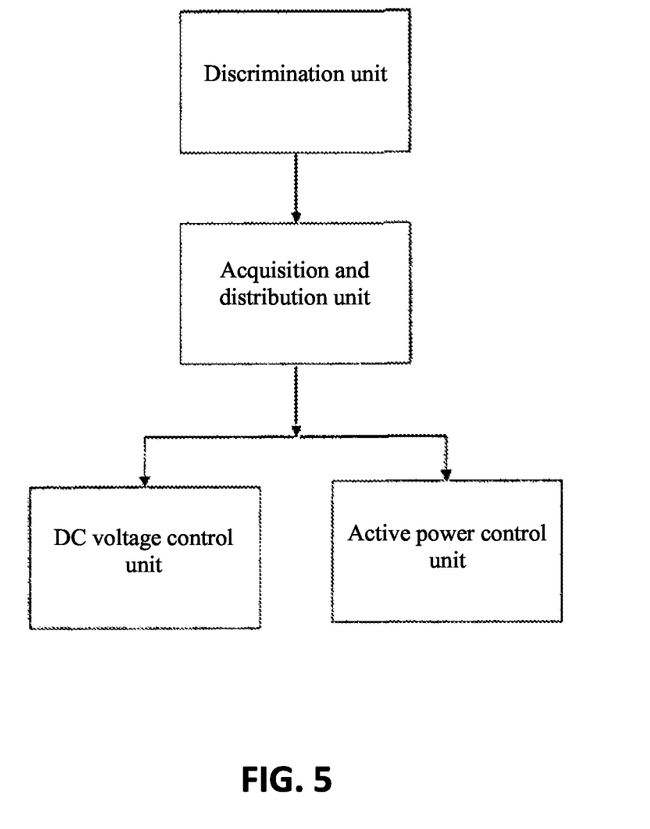
FIG. 5 is a structural block diagram of a coordination control device of series voltage source converter valve groups provided by the present invention.

The present invention also provides a coordinated control device for series voltage source converter valve groups, as shown in FIG. 5, which includes a discrimination unit, an acquisition and distribution unit, a DC voltage control unit and an active power control unit, wherein:

The discrimination unit is configured for determining whether the end where the series voltage source converter valve group is located is a DC voltage control end based on the operating status of the DC electrode;

The acquisition and distribution unit is configured for obtaining a total DC voltage reference value $U_{dcref}$, a total active power reference value $P_{ref}$, a DC voltage measured value $U_{dV-i}$ of each valve group among operating valve groups etc. based on the operating status of the DC electrode, and allocating the total DC voltage reference value $U_{dcref}$ and the total active power reference value $P_{ref}$ according to the total number N of voltage source converter valve groups in series, and obtaining a DC voltage reference value $U_{dVref-i}$ of the valve group and the active power reference value $P_{Vref-i}$ of the valve group for each operating voltage source converter valve group after evenly allocating the total DC voltage reference value;

The DC voltage control unit is configured for controlling the DC voltage of the valve group based on the DC voltage reference value $U_{dVref-i}$ of the valve group and the DC voltage measured value $U_{dV-i}$ of the valve group for each operating valve group in the series voltage source converter valve groups at the DC voltage control end of DC electrode, and realizing the control for the DC voltage of the DC electrode and the DC voltage balance for each operating valve group.

The active power control unit is configured for controlling the active power of the valve group based on an active power reference value $P_{Vref-i}$ of the valve group and an active power compensation amount $\Delta P_{V-i}$ of the valve group for each operating valve group in the series voltage source converter valve groups at the active power control end of DC electrode, and realizing the control for the active power of the DC electrode and the DC voltage balance for each operating valve group.

The DC voltage control unit includes the following subunits:

a calculation subunit of DC voltage reference value of the valve group for DC voltage control, configured for obtaining a total DC voltage reference value $U_{dcref}$ at the end where the series voltage source converter valve group is located according to a DC voltage control target of the DC electrode, allocating the total DC voltage reference value according to the total number N of voltage source converter valve groups in series, and obtaining a DC voltage reference value $U_{dVref-i}$ of the valve group for each operating voltage source converter valve group after evenly allocating the total DC voltage reference value, where $$U_{dVref-i} = \frac{U_{dcref}}{N},$$

$i \in (1, \ldots, N)$, N is a positive integer;

a receiving subunit of DC voltage measured value of the valve group for DC voltage control, configured for obtaining a DC voltage measured value $U_{dV-i}$ of the valve group for each operating valve group in the series voltage source converter valve groups;

a calculation subunit of DC bias of the valve group for DC voltage control, configured for using ½ of the DC voltage reference value $U_{dVref-i}$ of the valve group for each operating valve group in the series voltage source converter valve groups as a bridge arm voltage DC bias of this valve group;

a control subunit of the valve group for DC voltage control, configured for calculating a difference between the DC voltage reference value $U_{dVref-i}$ of the valve group and the DC voltage measured value $U_{dV-i}$ of the valve group for each operating valve group in the series voltage source converter valve groups, and inputting the difference into a DC voltage control outer loop of this valve group, so as to perform closed-loop control of the DC voltage of this valve group.

The active power control unit includes the following subunits:

a calculation subunit of active power reference value of the valve group for active power control, configured for obtaining a total active power reference value $P_{ref}$ at the end where the series voltage source converter valve group is located according to an active power control target of the DC electrode, allocating the total active power reference value according to the total number N of voltage source converter valve groups in series, and obtaining an active power reference value $P_{Vref-i}$ of the valve group for each operating voltage source converter valve group after evenly allocating the total active power reference value, where $$U_{dVref-i} = \frac{u_{dcref}}{N},$$

$i \in (1, \ldots, N)$, N is a positive integer;

a calculation subunit of DC voltage reference value of the valve group for active power control, configured for obtaining a total DC voltage reference value $U_{dcref}$ at the end where the series voltage source converter valve group is located, allocating the total DC voltage reference value according to the total number N of voltage source converter valve groups in series, and obtaining a DC voltage reference value $U_{dVref-i}$ of the valve group after evenly allocating the total DC voltage reference value among operating voltage source converter valve groups, where $$U_{dVref-i} = \frac{U_{dcref}}{N},$$

$i \in (1, \ldots, N)$, N is a positive integer;

a receiving subunit of DC voltage measured value of the valve group for active power control, configured for obtaining a DC voltage measured value $U_{dV-i}$ of the valve group for each operating valve group in the series voltage source converter valve groups.

a calculation subunit of DC bias of the valve group for active power control configured for using ½ of the DC voltage reference value $U_{dVref-i}$ of the valve group for each operating valve group in the series voltage source converter valve groups as a bridge arm voltage DC bias of this value group;

a control subunit of valve group for active power control, configured for obtaining an active power compensation amount $\Delta P_{V-i}$ of the valve group which has voltage-equalization effect for the valve group for each operating valve group of the series voltage source converter valve groups, and adding the active power compensation amount $\Delta P_{V-i}$ of the valve group and the active power reference value $P_{Vref-i}$ of the valve group to obtain a value, and inputting the value into active power control outer loop of the valve group so as to control the active power of this valve group.

In the control subunit of valve group for active power control, specific steps of obtaining an active power compensation amount $\Delta P_{V-i}$ of the valve group for each operating valve group, which has voltage-equalization effect for the valve group, include:

Step c1, calculating a difference between DC voltage reference value $U_{dVref-i}$ of the valve group and the DC voltage measured value $U_{dV-i}$ of the valve group to obtain a DC voltage deviation $\Delta U_{dV-i}$ of this valve group;

Step c2, inputting the DC voltage deviation $\Delta U_{dV-i}$ of this valve group into a valve group voltage-equalizing compensator of this valve group, and calculating the DC voltage deviation $\Delta U_{dV-i}$ of this valve group in the valve group voltage-equalizing compensator of this valve group by using proportional or integral or proportional plus integral method to obtain the active power compensation amount $\Delta P_{V-i}$ of the valve group.

In the DC voltage control unit, when the output of the DC voltage control outer loop of one operating valve group is limited by a current inner loop limit, the current inner loop limit of the valve group is simultaneously applied to other operating valve groups to maintain the DC voltage balance between each operating valve group.

In the active power control unit, when the output of the active power control outer loop of one operating valve group is limited by a current inner loop limit, the current inner loop limit of the valve group is simultaneously applied to the other operation valve groups to maintain the DC voltage balance between each operating valve group.

The above embodiments are only for explaining the technical idea of the present invention, and the scope of protection of the present invention is not limited thereto. Any modification made based on the technical idea according to the technical idea of the present invention falls within the protection scope of the present invention.

What is claimed is:

1. A coordinated control method for series voltage source converter valve groups, wherein the series voltage source converter valve groups refer to N voltage source converter valve groups connected in series, N is the total number of voltage source converter valve groups connected in series, the N voltage source converter valve groups can be configured at a DC voltage control end of a DC electrode or configured at an active power control end of the DC electrode in a DC transmission system, characterized in that, the control method including the following steps when the N voltage source converter valve groups connected in series are configured at the DC voltage control end of the DC electrode:

step a1, obtaining a total DC voltage reference value $U_{dcref}$ at the DC voltage control end where the series voltage source converter valve groups are located according to a DC voltage control target of the DC electrode, allocating the total DC voltage reference value $U_{dcref}$ according to the total number N of voltage source converter valve groups in series by evenly dividing the total DC voltage reference value among the N voltage source converter valve groups, and obtaining a DC voltage reference value $U_{dVref-i}$ of each voltage source converter valve group for the N voltage source converter valve groups in operating after evenly allocating the total DC voltage reference value, where $$U_{dVref-i} = \frac{U_{dcref}}{N},$$

i∈(1, . . . , N);

step a2, obtaining a DC voltage measured value $U_{dV-i}$ of each voltage source converter valve group for the series voltage source converter valve groups in operating;

step a3, using ½ of the DC voltage reference value $U_{dVref-i}$ of said each voltage source converter valve group for the series voltage source converter valve groups in operating as a bridge arm voltage DC bias of said each voltage source converter valve group;

step a4: for said each voltage source converter valve group of the series voltage source converter valve groups, calculating a difference between the DC voltage reference value $U_{dVref-i}$ of said each voltage source converter valve group and the DC voltage measured value $U_{dV-i}$ of said each voltage source converter valve group, and then inputting the difference into a DC voltage control outer loop of said each voltage source converter valve group, so as to perform closed-loop control of a DC voltage of said each voltage source converter valve group, the control method including the following steps when the N voltage source converter valve groups connected in series are configured at the active power control end of the DC electrode:

step b1, obtaining a total active power reference value $P_{ref}$ at the active power control end where the series voltage source converter valve groups are located according to an active power control target of the DC electrode, allocating the total active power reference value $P_{ref}$ according to the total number N of voltage source converter valve groups in series by evenly dividing the total active power reference value among the N voltage source converter valve groups, and then obtaining an active power reference value $P_{Vref-i}$ of each voltage source converter valve group for the voltage source converter valve groups in operating after evenly allocating the total active power reference value, where the $$P_{Vref-i} = \frac{P_{ref}}{N},$$

i∈(1, . . . , N);

step b2, obtaining a total DC voltage reference value at the active power control end where the series voltage source converter valve groups are located, allocating the total DC voltage reference value at the active power control end according to the total number N of voltage source converter valve groups in series by evenly dividing the total DC voltage reference value at the active power control end among the N voltage source converter valve groups, and obtaining a DC voltage reference value at the active power control end of each voltage source converter valve group for the N voltage source converter valve groups in operating after evenly allocating the total DC voltage reference value at the active power control end;

step b3, obtaining a DC voltage measured value at the active power control end of each voltage source converter valve group for the series voltage source converter valve groups in operating;

step b4, using ½ of the DC voltage reference value at the active power control end of said each voltage source converter valve group for the series voltage source converter valve groups in operating as a bridge arm voltage DC bias of said each voltage source converter valve group at the active power control end;

step b5, for said each voltage source converter valve group at the active power control end, obtaining an active power compensation amount $\Delta P_{V-i}$ of said each voltage source converter valve group at the active power control end which has voltage-equalization effect for said each voltage source converter valve group at the active power control end, and adding an active power compensation amount $\Delta P_{V-i}$ of said each voltage source converter valve group at the active power control end and the active power reference value $P_{Vref-i}$ of said each voltage source converter valve group at the active power control end to obtain a value, and then inputting the value into the active power control outer loop of said each voltage source converter valve group at the active power control end so as to control the active power of said each voltage source converter valve group at the active power control end.

2. The coordinated control method for series voltage source converter valve groups according to claim 1, characterized in that: for the N voltage source converter valve groups configured at the active power control end of DC electrode, in the step b5, specific steps of obtaining an active power compensation amount $\Delta P_{V-i}$ of said each voltage source converter valve group at the active power control end, which has voltage-equalization effect for said each voltage source converter valve group at the active power control end, including:

Step c1, calculating a difference between the DC voltage reference value of said each voltage source converter valve group at the active power control end and the DC voltage measured value of said each voltage source converter valve group at the active power control end to obtain a DC voltage deviation of said each voltage source converter valve group at the active power control end;

Step c2, inputting the DC voltage deviation of said each voltage source converter valve group at the active power control end into a valve group voltage-equalizing compensator of said each voltage source converter valve group at the active power control end, and calculating the DC voltage deviation of said each voltage source converter valve group at the active power control end in the valve group voltage-equalizing compensator of said each voltage source converter valve group at the active power control end by using proportional or integral or proportional plus integral method to obtain the active power compensation amount $\Delta P_{V-i}$ of said each voltage source converter valve group at the active power control end.

3. The coordinated control method for series voltage source converter valve groups according to claim 1, characterized in that, for the series voltage source converter valve groups configured at the DC voltage control end of DC electrode, simultaneously applying a current inner loop limit of one voltage source converter valve group in operating to other voltage source converter valve groups in operating to maintain the DC voltage balance between each voltage source converter valve group in operating if the output of the DC voltage control outer loop of said each voltage source converter valve group in operating is limited by the current inner loop limit.

4. The coordinated control method for series voltage source converter valve groups according to claim 1, characterized in that: for the series voltage source converter valve groups configured at the active power control end of DC electrode, simultaneously applying a current inner loop limit of one voltage source converter valve group in operating to other voltage source converter valve groups in operating to maintain the DC voltage balance between each voltage source converter valve group in operating if the output of the active power control outer loop of said each voltage source converter valve group in operating is limited by a current inner loop limit.

5. A coordinated control device for series voltage source converter valve groups, wherein the series voltage source converter valve groups refer to N voltage source converter valve groups connected in series, N is the total number of voltage source converter valve groups connected in series, the N voltage source converter valve groups can be configured at a DC voltage control end of a DC electrode or configured at active power control end of the DC electrode of a DC power transmission system, characterized in that the device comprising: a discrimination unit, an acquisition and distribution unit, a DC voltage control unit and an active power control unit, wherein:

the discrimination unit is configured for determining whether the end where the series voltage source converter valve groups are located is a DC voltage control end based on the operating status of the DC electrode;

the acquisition and distribution unit is configured for obtaining a total DC voltage reference value $U_{dcref}$ at the DC voltage control end, a total DC voltage reference value at the active power control end, a total active power reference value $P_{ref}$, a DC voltage measured value $U_{dV-i}$ at the DC voltage control end, a DC voltage measured value at the active power control end for each voltage source converter valve group based on the operating status of the DC electrode, and allocating the total DC voltage reference value $U_{dcref}$ at the DC voltage control end, a total DC voltage reference value at the active power control end and the total active power reference value $P_{ref}$ according to the total number N of voltage source converter valve groups in series, and obtaining a DC voltage reference value $U_{dVref-i}$ at the DC voltage control end, a DC voltage reference value at the active power control end for said each voltage source converter valve group and the active power reference value $P_{Vref-i}$ for said each voltage source converter valve group after evenly allocating the total DC voltage reference value at the active power control end;

the DC voltage control unit is configured for controlling the DC voltage of said each voltage source converter valve group at the DC voltage control end of the DC electrode based on the DC voltage reference value $U_{dVref-i}$ at the DC voltage control end for said each voltage source converter valve group and the DC voltage measured value $U_{dV-i}$ for said each voltage source converter valve group of the series voltage source converter valve groups at the DC voltage control end of the DC electrode, and realizing the control for the DC voltage of the DC electrode and the DC voltage balance for said each voltage source converter valve group;

the active power control unit is configured for controlling the active power of said each voltage source converter valve group at based on an active power reference value $P_{Vref-i}$ of said each voltage source converter valve group at the active power control end and an active power compensation amount $\Delta P_{V-i}$ of the valve group for said each voltage source converter valve group at the active power control end in the series voltage source converter valve groups at the active power control end of the DC electrode, and realizing the control for the active power of the DC electrode and the DC voltage balance for each voltage source converter valve group at the active power control end of the DC electrode;

the DC voltage control unit comprising the following subunits:

a calculation subunit of DC voltage reference value of the voltage source converter valve group for DC voltage control, configured for obtaining a total DC voltage reference value $U_{dcref}$ at the end where the series voltage source converter valve groups are located according to a DC voltage control target of the DC electrode, allocating the total DC voltage reference value according to the total number N of voltage source converter valve groups in series by evenly dividing the total DC voltage reference value among the N voltage source converter valve groups, and obtaining a DC voltage reference value $U_{dVref-i}$ of each voltage source converter valve group for the N voltage source converter valve groups in operating after evenly allocating the total DC voltage reference value, where $$U_{dVref-i} = \frac{U_{dcref}}{N},$$

$i \in (1, \ldots, N)$;
  a receiving subunit of the DC voltage measured value of the voltage source converter valve group for DC voltage control, configured for obtaining a DC voltage measured value $U_{dV-i}$ of each voltage source converter valve group for the series voltage source converter valve groups;
  a calculation subunit of DC bias of the voltage source converter valve group for DC voltage control, configured for using ½ of the DC voltage reference value $U_{dVref-i}$ of each voltage source converter valve group for the series voltage source converter valve groups in operating as a bridge arm voltage DC bias of said each voltage source converter valve group;
  a control subunit of the voltage source converter valve group for DC voltage control, configured for calculating a difference between the DC voltage reference value $U_{dVref-i}$ of each voltage source converter valve group and the DC voltage measured value $U_{dV-i}$ of each voltage source converter valve group for the series voltage source converter valve groups in operating, and inputting the difference into a DC voltage control outer loop of said each voltage source converter valve group, so as to perform closed-loop control of a DC voltage of said each voltage source converter valve group,
the active power control unit including the following subunits:
  a calculation subunit of active power reference value of the voltage source converter valve group for active power control, configured for obtaining a total active power reference value $P_{ref}$ at the active power control end where the series voltage source converter valve groups are located according to an active power control target of the DC electrode, allocating the total active power reference value according to the total number N of voltage source converter valve groups in series by evenly dividing the total active power reference value among the N voltage source converter valve groups, and obtaining an active power reference value $P_{Vref-i}$ of each voltage source converter valve group for the voltage source converter valve groups in operating after evenly allocating the total active power reference value, where $$P_{Vref-i} = \frac{P_{ref}}{N},$$

$i \in (1, \ldots, N)$;
  a calculation subunit of the DC voltage reference value of the voltage source converter valve group for active power control, configured for obtaining a total DC voltage reference value at the active power control end where the series voltage source converter valve groups are located, allocating the total DC voltage reference value at the active power control end according to the total number N of voltage source converter valve groups in series by evenly dividing the total DC voltage reference value at the active power control end among the N voltage source converter valve groups, and obtaining a DC voltage reference value at the active power control end of each voltage source converter valve group for the N voltage source converter valve groups in operating after evenly allocating the total DC voltage reference value at the active power control end;
  a receiving subunit of the DC voltage measured value of the voltage source converter valve group for active power control, configured for obtaining a DC voltage measured value at the active power control end of each voltage source converter valve group for the series voltage source converter valve groups in operating;
  a calculation subunit of DC bias of the voltage source converter valve group for active power control, configured for using ½ of the DC voltage reference value at the active power control end of said each voltage source converter valve group for the series voltage source converter valve groups in operating as a bridge arm voltage DC bias of said each voltage source converter valve group at the active power control end;
  a control subunit of the voltage source converter valve group for active power control, configured for obtaining an active power compensation amount $\Delta P_{V-i}$ of the valve group which has voltage-equalization effect for said each voltage source converter valve group at the active power control end for the series voltage source converter valve groups in operating, and adding the active power compensation amount $\Delta P_{V-i}$ of said each voltage source converter valve group at the active power control end and the active power reference value $P_{Vref-i}$ of said each voltage source converter valve group at the active power control end to obtain a value, and inputting the value into an active power control outer loop of the valve group so as to control the active power of said each voltage source converter valve group at the active power control end.

6. The coordinated control device for series voltage source converter valve groups according to claim 5, characterized in that: in the control subunit of the voltage source converter valve group for active power control, specific steps of obtaining an active power compensation amount $\Delta P_{V-i}$ of each voltage source converter valve group, which has voltage-equalization effect for each voltage source converter valve group, including:
  step c1, calculating a difference between the DC voltage reference value of said each voltage source converter valve group at the active power control end and the DC voltage measured value of said each voltage source converter valve group at the active power control end to obtain a DC voltage deviation of said each voltage source converter valve group at the active power control end;
  step c2, inputting the DC voltage deviation of said each voltage source converter valve group at the active power control end into a valve group voltage-equalizing compensator of said each voltage source converter valve group at the active power control end, and calculating the DC voltage deviation of said each voltage source converter valve group at the active power control end in the valve group voltage-equalizing compensator of said each voltage source converter valve group at the active power control end by using proportional or integral or proportional plus integral method to obtain the active power compensation amount $\Delta P_{V-i}$ of said each voltage source converter valve group at the active power control end.

7. The coordinated control device for series voltage source converter valve groups according to claim 5, characterized in that: in the DC voltage control unit, simultaneously applying a current inner loop limit of one voltage source converter valve group in operating to other voltage source converter valve groups in operating to maintain the DC voltage balance between each voltage source converter valve group in operating if the output of the DC voltage control outer loop of said each voltage source converter valve group in operating is limited by the current inner loop limit.

8. The coordinated control device for series voltage source converter valve groups according to claim 5, characterized in that: in the active power control unit, simultaneously applying a current inner loop limit of one voltage source converter valve group in operating to other voltage source converter valve groups in operating to maintain the DC voltage balance between each voltage source converter valve group in operating if the output of the active power control outer loop of said each voltage source converter valve group in operating is limited by a current inner loop limit.

* * * * *